United States Patent [19]
Ramanathan

[11] 3,860,571
[45] *Jan. 14, 1975

[54] BASIC AZO DYESTUFFS FROM AN 1-ARYL-5-HYDROXY-OR-AMINO-PYRAZOLE COUPLING COMPONENT

[75] Inventor: Visvanathan Ramanathan, Basel, Switzerland

[73] Assignee: Ciba-Geigy AG, Basel, Switzerland

[ * ] Notice: The portion of the term of this patent subsequent to May 16, 1989, has been disclaimed.

[22] Filed: June 17, 1971

[21] Appl. No.: 154,168

[30] Foreign Application Priority Data
July 8, 1970  Switzerland.................... 10308/70
Apr. 23, 1971  Switzerland.................... 5941/71

[52] U.S. Cl................ 260/156, 8/41 A, 260/146 R, 260/147, 260/155, 260/157, 260/158, 260/160, 260/162, 260/163
[51] Int. Cl..................... C09b 29/38, D06p 3/76
[58] Field of Search........... 260/155, 156, 157, 158, 260/162, 163, 160

[56] References Cited
UNITED STATES PATENTS

| | | | |
|---|---|---|---|
| 3,117,960 | 1/1964 | Illy..................................... | 260/156 |
| 3,213,079 | 10/1965 | Maderni et al..................... | 260/147 |
| 3,395,138 | 7/1968 | Altermatt et al................... | 260/163 |
| 3,449,317 | 6/1969 | De Montmollin................... | 260/161 |
| 3,519,615 | 7/1970 | Wolfrum et al..................... | 260/155 |
| 3,524,842 | 8/1970 | Grossmann et al................. | 260/151 |
| 3,549,612 | 12/1970 | Clarke................................ | 260/160 |
| 3,560,476 | 2/1971 | Entschel et al..................... | 260/152 |
| 3,579,498 | 5/1971 | Dunworth.......................... | 260/158 |
| 3,663,528 | 5/1972 | Ramanathan...................... | 260/156 |

*Primary Examiner*—Floyd D. Higel
*Attorney, Agent, or Firm*—Joseph G. Kolodny; Dr. Edw. McC. Roberts; Dr. Prabodh I. Almaula

[57] ABSTRACT

Basic azo dyestuffs which are preferably free of acid groups which confer solubility in water, and correspond to the general formula D-N=N-Pz wherein D denotes the radical of a diazo component which optionally contains azo groups, and Pz denotes the radical of a 1-aryl-5-hydroxy- or -amino-pyrazole which is bonded in the 4-position to the azo group and which in the 1-position on the aryl nucleus contains an optionally quaternised amino, hydrazino or etherified hydroxylamino group bonded via an alkylene or alkyleneoxy bridge. The dyestuffs are particularly useful in dyeing polyacrylonitrile in shades of good fastness to light and good general fastness properties.

11 Claims, No Drawings

BASIC AZO DYESTUFFS FROM AN 1-ARYL-5-HYDROXY-OR-AMINO-PYRAZOLE COUPLING COMPONENT

The present invention relates to new, valuable azo dyestuffs which are preferably free of sulpho groups, of the general formula (1) 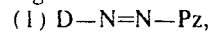

wherein D denotes the radical of a diazo component which optionally contains azo groups, and Pz denotes the radical of a 1-aryl-5-hydroxy- or -amino-pyrazole which is bonded in the 4-position to the azo group and which in the 1-position on the aryl radical contains an optionally quaternised amino, hydrazino or etherified hydroxylamino group bonded via an alkylene or alkyleneoxy group. It relates, above all, to azo dyestuffs of the formula (2) 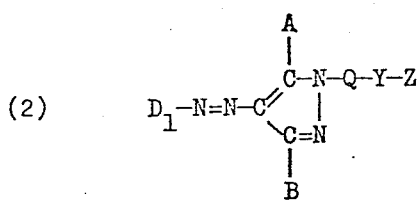

wherein Y denotes an optionally branched alkylene or alkyleneoxy bridge containing at most 4 carbon atoms, A denotes a hydroxyl or amino group, B denotes hydrogen, an alkyl, alkoxy or aryl group or, if A represents a hydroxyl group, also a carboxylic acid amide or carboxylic acid ester group, Q denotes an arylene bridge, especially a phenylene bridge which is optionally substituted by halogen, alkyl or alkoxy, Z denotes an optionally quaternised amino, hydrazino or etherified hydroxylamino group and $D_1$ denotes the radical of an aromatic or heterocyclic diazo component, which optionally contains an azo group.

Particularly interesting dyestuffs are those of the formula (3) 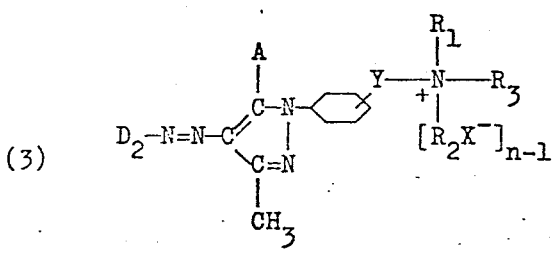

wherein A has the indicated meaning, $D_2$ denotes the radical of an aromatic diazo component of the benzene series or of an at most bicyclic heterocyclic diazo component, Y has the indicated meaning, $R_1$ and $R_2$ denote hydrogen or an alkyl, aralkyl or cycloalkyl radical, $R_3$ denotes hydrogen or an alkyl, aralkyl, cycloalkyl or alkoxy radical or an amino group, and N together with $R_1$ and/or $R_2$ and/or $R_3$ can form part of a heterocyclic ring, and X denotes an anion and n denotes 1 or 2.

According to the invention, the manufacture of the new dyestuffs can be effected by amidation or condensation, coupling or quaternisation. The manufacture by amidation or condensation is characterised in that azo compounds of the formulae (1), (2) or (3), which instead of the amino, hydrazino or hydroxylamino group possess a reactive atom or a reactive group, for example a halogen atom or an ester grouping preferably derived from a strong inorganic oxygen-containing acid or from an aliphatic or aromatic sulphonic acid, such as, for example, a sulphato group or an arylsulphonyloxy or alkylsulphonyloxy group, bonded via the alkylene bridge, for example the bridge Y, are reacted with an amine, hydrazine or etherified hydroxylamine.

The manufacture by coupling is characterised in that diazotised amines of the formulae $D-NH_2$, $D_1-NH_2$ or $D_2-NH_2$ are coupled with the coupling components present in the dyestuffs of the formulae (1) to (3) (hydrogen in place of $D-N=N-$, $D_1-N=N-$ or $D_2-N=N-$).

In the manufacture by quaternisation, dyestuffs of the formulae (1) to (3) which contain a non-quaternised amino, hydrazino or etherified hydroxylamino group, are treated with quaternising agents, that is to say, for example, dyestuffs of the formula (3), wherein $n = 1$, and $D_2$, Y, $R_1$ and $R_3$ have the indicated meaning, are reacted with compounds of the formula $R_2X$, wherein X has the indicated meaning and $R_2$ represents an alkyl, aralkyl or cycloalkyl radical.

The azo dyestuffs used in the manufacture by amidation or condensation are appropriately obtained by coupling diazotised amines, preferably of the aromatic or heterocyclic series, with the coupling components which have been defined. A list of possible diazo components is given later when explaining the manufacture by coupling; as coupling components, it is again possible to use the pyrazoles indicated later, but instead of the amino, hydrazino or etherified hydroxylamino group bonded terminally to the alkylene bridge, a removable atom or a removable group, for example a chlorine atom or a sulphato group, must be present. The dyestuffs manufactured from these components by coupling are reacted, according to the invention, with amines, hydrazines or etherified hydroxylamines. Suitable compounds for this reaction are above all those which possess hydrogen atoms, aliphatic radicals which optionally contain ether bridges or hydroxyl groups and possess at most 4 carbon atoms, or cyclohexyl, benzyl or phenyl radicals, on the nitrogen atom or on the nitrogen atoms, or in which the nitrogen atom is a ring atom of a 5-membered or 6-membered, saturated or unsaturated ring, which can optionally contain a nitrogen, oxygen or sulphur atom as a further hetero-atom and can optionally have an aromatic ring fused to it. As such compounds, the following may, for example, be mentioned:

Amines

Primary and secondary amines, such as ammonia, methylamine, ethylamine, isopropylamine, methoxyethylamine, methoxypropylamine, dimethylamine, diethylamine, methylphenylamine, ethylphenylamine, chloroethylamine, ethanolamine, diethanolamine, propanolamine, benzylamine or cyclohexylamine, morpholine, pyrrolidine, piperidine and piperazine, and tertiary amines, such as trimethylamine, triethylamine, triethanolamine, pyridine, picoline, lutidine, N-methylpiperidine, N-methyl-piperazine, N-methylmorpholine, quinoline or pyrimidine.

Hydrazines

N-Methylhydrazine, N,N-dimethylhydrazine, N,N'-diethylhydrazine, N,N,N'-trimethylhydrazine, N,N,N,N'-tetramethylhydrazine, N-aminopiperidine, N- aminopyrrolidine and 1,5-diazabicyclo-(0,3,3)-octane.
Etherified hydroxylamines

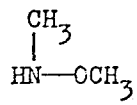
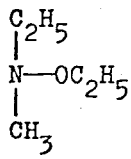
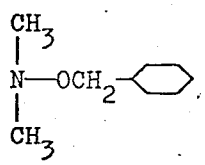

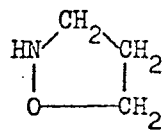
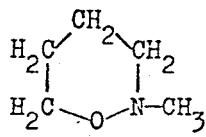
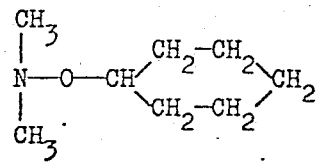

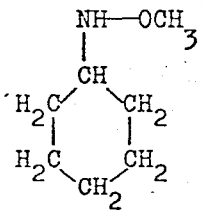
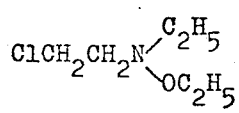
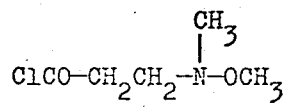

or

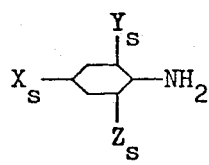

The reaction of the dyestuff containing, for example, a halogen or sulphato-alkyl group, with the amine, hydrazine or etherified hydroxylamine is carried out in a neutral solvent, for example in chlorobenzene, alcohols or aqueous alcohol mixtures or dimethylformamide, or without solvents, appropriately at elevated temperature in an excess of the hydroxylamine, and optionally with the addition of catalysts, for example NaI.

In the manufacture, according to the invention, by coupling a diazotised amine is coupled to a hydroxypyrazole or aminopyrazole, the coupling component already containing the amine, hydrazine or etherified hydroxylamine radical.

As examples of diazo compounds, there should above all be mentioned aromatic diazo compounds, for example those of the naphthalene series and especially of the benzene series, which contain, as substituents, especially halogen atoms or nitro, sulphonamide, phenyl, phenoxy or phenylazo groups or low molecular alkyl, halogenoalkyl, alkoxy, alkylsulphonyl, N-alkylated sulphonamide or carboxylic acid alkyl ester groups, "low molecular" meaning a number of at most 4 aliphatically bonded carbon atoms. Such diazo components preferably correspond to the formula $$X_s \text{—} \underset{Z_s}{\overset{Y_s}{\bigcirc}} \text{—} NH_2$$

wherein $X_s$ denotes a hydrogen or halogen atom or a nitrile, carbalkoxy, alkanesulphonyl, sulphonamide, phenylazo or nitro group, $Y_s$ denotes a hydrogen or halogen atom or a nitro, alkyl, alkoxy, trifluoromethyl, carbalkoxy or nitrile group, and $Z_s$ denotes a hydrogen or halogen atom, with at least one of the radicals $X_s$ and $Y_s$ denoting a halogen atom or a nitro, carbalkoxy, nitrile, alkylsulphonyl, sulphonamide or phenylazo group.

The following may, for example, be mentioned from the series of the usable diazo components of the benzene series: aniline, 1-amino-3- or -4-chlorobenzene, 1-amino-4-bromobenzene, 1-amino-2-, -3- or -4-methylbenzene, 1-amino-2-, -3- or -4-nitrobenzene, 1-amino-4-cyanobenzene, 1-aminobenzene-3- or -4-methylsulphone, 1-amino-2-chlorobenzene-4-methylsulphone, 1-amino-2,5-dicyanobenzene, 1-amino-4-carboethoxybenzene, 1-amino-2,4- or -2,5-dichlorobenzene, 1-amino-2,4-dibromobenzene, 1-amino-2-methyl-4- or -6-chlorobenzene, 1-amino-2-trifluoro-methyl-4-chlorobenzene, 1-amino-2-cyano-4-chlorobenzene, 1-amino-2-cyano-4-nitrobenzene, 1-amino-2-carbomethoxy-4-chlorobenzene, 1-amino-2-methanesulphonyl-4-chlorobenzene, 1-amino-2-carbomethoxy-4-nitrobenzene, 1-amino-2-phenoxy-4-nitrobenzene, 1-amino-2-chloro-4-cyanobenzene, 1-amino-2-chloro-4-nitrobenzene, 1-amino-2-methoxy-4-nitrobenzene, 1-amino-2-chloro-4-carboethoxybenzene, 1-amino-2,4-dinitrobenzene, 1-amino-2,4-dicyanobenzene, 1-amino-2,6-dichloro-4-cyanobenzene, 1-amino-2,6-dichloro-4-nitrobenzene, 1-amino-2,5- or -2,6-dichlorobenzene-4-sulphonic acid dimethylamide, 1-amino-2-chlorobenzene-4-sulphonic acid dimethylamide, 1-amino-2,6-dibromobenzene-4-sulphonic acid amide, 1-amino-2,4-dinitro-6-chloro- or -6-bromobenzene, 1-amino-2,4-dicyano-6-chlorobenzene, 1-amino-2,4,6-trichloro- or -tribromobenzene, 1-aminobenzene-3- or -4-sulphonic acid amide, 1-aminobenzene-3- or -4-sulphonic acid N-methylamide or N-diethylamide, 4-aminoazobenzene, 4-amino-2'-chloro-azobenzene, 4-amino-2',4'-dichloro-azobenzene, 4-amino-3'-chloro-azobenzene, 4-amino-2'-nitro-azobenzene, 1-amino-4-nitrobenzene-2-methylsulphone, 1-aminobenzene-4-carboxylic acid β-methoxyethyl ester, 4-amino-3-nitroazobenzene, 4-amino-3'-nitro-azobenzene, 4-amino-2-methyl-azobenzene, 4-amino-4'-methoxy-azobenzene, 4-amino-3-nitro-2'-chloro-azobenzene, 4-amino-3-nitro-4'-chloro-azobenzene, 4-amino-3-nitro-2',4'-dichloro-azobenzene, 4-amino-3-nitro-4'-methoxy-azobenzene, 4-aminodiphenyl and 2- or 4-aminodiphenyl-ether.

It is, however, also possible to use, as diazo components, any desired diazotisable heterocyclic amines which do not contain any acid substituents which impart solubility in water, but especially the amines which contain a heterocyclic five-membered ring with 2 to 3 hetero-atoms, above all one nitrogen atom and one or two sulphur, oxygen or nitrogen atoms as hetero-atoms.

The heterocyclic diazo components which can be used can also contain the substituents mentioned in the case of the aromatic diazo components. They can, for example, originate from the pyridine, pyrazole, imidazole, triazole, tetrazole, oxazole, thiazole, selenazole, oxdiazole, thiadiazole, pyrimidine, triazine, quinoline, indazole, benzimidazole, naphthimidazole, benzoxazole, naphthoxazole, benzthiazole, naphthothiazole or benzoselenazole series. The following may be mentioned as examples: 2-aminothiazole, 2-amino-5-nitrothiazole, 2-amino-5-methylsulphonyl-thiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 3-amino-1-(4'-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-nitrobenzthiazole, 2-amino-6-carboethoxybenzthiazole, 2-amino-6-methylsulphonylbenzthiazole, 2-amino-1,3,4-thiadiazole, 2-amino-1,3,5-thiadiazole, 2-amino-4-phenyl- or -4-methyl-1,3,5-thiadiazole and 2-amino-5-phenyl-1,3,4-thiadiazole.

Heterocyclic diazo components from the thiazole, thiadiazole or benzthiazole series are preferred.

The 1-aryl-pyrazoles used as coupling components contain a hydroxyl group, or a primary amino group, in the 5-position. The optionally quaternised amino, hydroxylamino or hydrazino group are bonded to the aryl nucleus located in the 1-position via an optionally branched aliphatic hydrocarbon bridge containing at most 4 carbon atoms. The following may be mentioned as examples of such coupling components: 1-p-(dimethylaminomethyl)-phenyl-3-methyl-5-hydroxypyrazole, 1-p-(diethylaminomethyl)-phenyl-3-propyl-5-hydroxypyrazole, 1-p-(piperidinomethyl)-phenyl-3-methyl-5-hydroxypyrazole, 1-m-(dimethylaminomethyl)-p-methylphenyl-3-methyl-5-hydroxypyrazole, 1-m-($\beta$-diethylaminoethyl)-o-chlorophenyl-3-ethoxycarbonyl-5-hydroxypyrazole, 1-p-(morpholinomethyl)-phenyl-3-methoxycarbonyl-5-hydroxypyrazole, 1-o-(dimethylaminomethyl)-phenyl-3-aminocarbonyl-5-hydroxypyrazole, 1-p-($\delta$-dimethylaminobutyl)-phenyl-3-methyl-5-hydroxypyrazole, 1-p-($\beta$-aminoethyl)-phenyl-3-butyl-5-hydroxypyrazole, 1-m-(dimethylaminomethyl)-phenyl-5-aminopyrazole, 1-p-($\beta$-aminoethyl)-phenyl-3-methyl-5-aminopyrazole, 1-o-(dimethylaminomethyl)-phenyl-3-methyl-5-aminopyrazole, 1-p-(bis-$\beta$-hydroxyethylaminomethyl)-phenyl-3-methyl-5-aminopyrazole, 1-p-($\beta$-morpholinoethyl)-o-methylphenyl-3-ethyl-5-aminopyrazole, 1-p-($\beta$-pyrrolidinylpropyl)-phenyl-3-methoxy-5-aminopyrazole, 1-p-(dimethylaminomethyl)-phenyl-3-methoxy-5-aminopyrazole, 1-p-(dimethylaminomethyl)-phenyl-3-phenyl-5-aminopyrazole, 1-p-($\beta$-dimethylaminoethoxy)-3-methyl-5hydroxypyrazole, 1-p-($\beta$-dimethylaminoethoxy)-3-methyl-5-aminopyrazole, as well as the corresponding 5-aminopyrazoles or 5-hydroxypyrazoles which possess a hydrazino or etherified hydroxylamino group instead of the terminal amino group or the alkylene bridge bonded to the phenyl nucleus in the 1-position of the aminopyrazole or hydroxypyrazole. By amino, hydrazino and etherified hydroxylamino group there are here not only to be understood the derivatives of ammonia, hydrazine or methoxyamine, but generally the radicals derived from the primary, secondary, tertiary or quaternary nitrogen compounds mentioned earlier. Such pyrazoles are manufactured, for example, by reacting nitriles, for example diacetonitrile, with hydrazines, for example p-dimethylaminomethylphenylhydrazine, to give the 5-aminopyrazoles, or by reacting $\beta$-keto-esters, for example acetoacetic ester, with hydrazines to give the 5-hydroxypyrazoles.

Instead of a single diazo component, it is also possible to use a mixture of two or more of the diazo components according to the invention, and instead of a single azo component it is also possible to use a mixture of two or more of the azo components according to the invention.

The diazotisation of the diazo components mentioned can be effected according to methods which are in themselves known, for example with the aid of mineral acid, especially hydrochloric acid, and sodium nitrite, or, for example, with a solution of nitrosylsulphuric acid in concentrated sulphuric acid.

The coupling can also be effected in a manner which is in itself known, for example in a neutral to acid agent, optionally in the presence of sodium acetate or similar buffer substances which influence the coupling speed or of catalysts, such as, for example pyridine or its salts.

Those of the new dyestuffs which contain a quaternised amino, hydrazino or etherified hydroxylamino group can, according to a third manufacturing variant, also be obtained by quaternising the corresponging dyestuffs which contain a non-quaternised amino, hydrazino or etherified hydroxylamino group, by treatment with alkylating agents. As such alkylating agents or quaternising agents it is possible to use, for example: esters of strong mineral acids or organic sulphonic acids, for example dimethyl sulphate, diethyl sulphate, alkyl halides, for example methyl chloride, bromide or iodide, aralkyl halides, for example benzyl chloride, esters of low molecular alkanesulphonic acids, such as, for example, methyl esters of methanesulfonic, ethanesulphonic or butanesulphonic acid, and esters of benzenesulphonic acids which can contain additional substituents, for example methyl, ethyl, propyl or butyl esters of benzenesulphonic acid, of 2- or 4-methylbenzenesulphonic acid, 4-chlorobenzenesulphonic acid or 3- or 4-nitrobenzenesulphonic acid.

The alkylation is appropriately effected by warming in an inert organic solvent, for example in hydrocarbons, such as benzene, toluene or xylene, halogenated hydrocarbons, such as carbon tetrachloride, tetrachloroethane, chlorobenzene or o-dichlorobenzene, or nitro-hydrocarbons, such as nitromethane, nitrobenzene or nitronaphthalene. Acid anhydrides, acid amides or nitriles, such as acetic anhydride, dimethylformamide or acetonitrile, as well as dimethylsulphoxide, can also be used as solvents for the alkylation. Instead of a solvent, a large excess of alkylating agent can also be used. In this case, admittedly, it is necessary to ensure that the mixture does not overheat excessively, since the reaction is strongly exothermic. Nevertheless it is necessary in most cases, especially in the presence of organic solvents, to warm the reaction mixture externally in order to start the reaction. In special cases, the alkylation can also be carried out in an aqueous medium or using an alcohol, optionally in the presence of small amounts of potassium iodide.

Depending on the conditions, the alkylation can at the same time also result in other nitrogen atoms being quaternised, for example nitrogen atoms which are present as ring atoms in the radical of a heterocyclic diazo component. Here there should especially be mentioned those dyestuffs in which the quaternisable ring nitrogen atom is connected to the amino group in the 5-position of the pyrazole by an uninterrupted chain of conjugated double bonds and is preferably adjacent to the ring carbon atom carrying the azo bridge.

The dyestuffs of the last-mentioned type, that is to say in which the ring nitrogen atom is additionally adjacent to the ring carbon atom carrying the azo bridge, can also be manufactured by oxidative coupling, that is to say by reaction of the hydrazone (instead of the diazotised amine) with the coupling component in the presence of oxidising agents, according to the reaction equation:

are suitable for dyeing and printing the most diverse wholly synthetic fibres, such as, for example, polyvinyl chloride, polyamide or polyurethane fibres, and also fibres of polyesters of aromatic dicarboxylic acids, such as, for example, of polyethylene-terephthalate fibres, but especially of polyacrylonitrile fibre materials or of polyvinylidene cyanide fibres (Darvan), as well as of anionically modified wholly synthetic polyamide and polyester fibres. By polyacrylonitrile fibres there are above all understood polymers which contain more than 80%, for example 80 to 95%, of acrylonitrile; in addition, they contain 5 to 20% of vinyl acetate, vinylpyridine, vinyl chloride, vinylidene chloride, acrylic acid, acrylic acid esters, methacrylic acid, methacrylic acid esters and the like. These products are, for example, sold under the following trade names: "Acrilan 1656" (The Chemstrand Corporation, Decatur, Alabama, USA), "Acrilan 41" (The Chemstrand Corporation), "Creslan" (American Cyanamid Company), "Orlon 44" (Du Pont), "Crylor HH" (Soc. Rhodiacéta SA, France), "Leacril N" (Applicazioni Chimice Società per Azioni, Italy), "Dynel" (Union Carbide Chem. Corp.), "Exlan" (Japan Exlan Industry Co., Japan), "Vonnel" (Mitsubishi, Japan), "Verel" (Tennessee Eastman, USA), "Zefran" (Dow Chemical, USA), "Wolcrylon" (Filmfabrik Agfa, Wolfen), "Ssaniw" (USSR) and also "Orlon 42","Dralon", "Courtelle" and the like.

On these fibres, which can also be dyed as mixtures with one another, the new dyestuffs yield intense and level dyeings of good fastness to light and good general

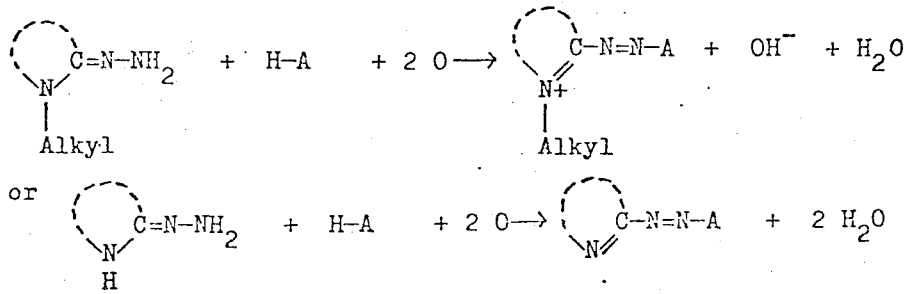

wherein A denotes the radical of the coupling component.

If it is necessary, the dyestuff salts are appropriately purified by dissolving them in water, whereupon any unreacted starting dyestuff can be filtered off as an insoluble residue. The dyestuff can again be separated out from the aqueous solution by adding water-soluble salts, for example sodium chloride.

The quaternised dyestuffs obtained according to the process preferably contain, as the anion, the radical of a strong inorganic acid, for example of hydrogen chloride, of sulphuric acid or of phosphoric acid, or the radical of a sulphuric acid half-ester or the radical of a sulphonic acid or carboxylic acid. The anions mentioned, which are introduced into the dyestuff molecule in accordance with the process, can also be replaced by anions of other inorganic acids, for example of phosphoric acid or sulphuric acid, or of organic acids, such as, for example, of formic acid, of lactic acid or of tartaric acid; in certain cases, the free bases can also be used. The dyestuff salts can also be used in the form of double salts, for example with halides of the elements of the second group of the periodic system, especially zinc chloride or cadmium chloride.

The dyestuffs or dyestuff salts obtained according to the invention, possessing an optionally quaternised amino, hydrazino or etherified hydroxylamino group, fastness properties, especially good fastness to washing, perspiration and sublimation, crease resistance, and fastness to decatising, ironing, rubbing, carbonising, water, chlorine water, seawater, dry cleaning, overdyeing and solvents. The new dyestuffs according to the invention inter alia also possess good stability over a major pH range, good affinity and good build-up capacity, for example in aqueous solutions of various pH values, and good fastness to kier boiling. Furthermore, the new dyestuffs generally show a good reserve effect on wool and other natural polyamide fibres, and on cotton.

The quaternised, water-soluble dyestuffs are in general less sensitive to electrolytes and in part show distinctly good solubility in water or polar solvents. Dyeing with the quaternised, water-soluble dyestuffs is in general carried out in an aqueous, neutral or acid, medium, at the boil under atmospheric pressure or in a closed vessel at elevated temperature and elevated pressure. The commercially available levelling agents do not interfere but are not necessary.

The dyestuffs indicated are above all also suitable for trichromatic dyeing. Furthermore, because of their resistance to hydrolysis, they are advantageously usable for high temperature dyeing and for dyeing in the presence of wool. They can also be applied to the fibre materials by printing. For this purpose a printing paste is for example used which contains the dyetuff in addition to the auxiliaries which are customary in printing. The dyestuffs are furthermore suitable for bulk dyeing polymerisation products of acrylonitrile, and also other plastic, optionally dissolved, compositions, in shades which are fast to light and to washing, as well as being suitable for dyeing oil paints or lacquers. Because of their good levelling characteristics they are above all also suitable for carpet dyeing.

The new water-insoluble or sparingly water-soluble dyestuffs manufactured according to the invention, which possess a non-quaternised amino, hydrazino or etherified hydroxylamino group, are appropriately used in a finely divided form and with the addition of dispersing agents, such as soap, sulphite cellulose waste lye or synthetic detergents, or of a combination of various wetting agents and dispersing agents. As a rule it is advisable to convert these dyestuffs, before dyeing, into a dyeing preparation which contains a dispersing agent and finely divided dyestuff in such a form that on dilution of the dyestuff preparations with water a fine dispersion results. Such dyestuff preparations can be obtained in a known manner, for example by grinding the dyestuff in high efficiency grinding devices, in the dry or wet form, with or without addition of dispersing agents during the grinding process. They are also suitable for dyeing and printing the most diverse semi-synthetic and wholly synthetic fibres, such as, for example, cellulose acetate, polyolefine, for example modified polypropylene, polyester, polyvinyl chloride, polyamide or polyurethane fibres, but especially fibres of polyacrylonitrile.

To achieve intense dyeing, it proves advisable to carry out the dyeing at higher temperatures, for example at the boil. Advantageously, a dispersing agent is added and the dyebath is rendered weakly acid, for example by adding a weak acid, for example acetic acid.

The new dyestuffs having a non-quaternised amino, hydrazino or etherified hydroxylamino group are furthermore also suitable for dyeing from organic solvents, such as, for example, for the continuous dyeing of polyacrylonitrile or polyester fibres from chlorinated aliphatic hydrocarbons, which optionally contain, for example, 10% of dimethylformamide.

The present dyestuffs can also be applied by printing. For this purpose, a printing ink is for example used, which contains the finely dispersed dyestuff, optionally mixed with other dyestuffs, in addition to the auxiliaries which are customary in printing, such as wetting agents and thickeners.

In the examples which follow the parts, unless otherwise stated, denote parts by weight and the percentages denote percentages by weight.

EXAMPLE 1

13.8 parts of 2-nitroaniline are triturated with 34 parts by volume of concentrated hydrochloric acid and diluted with 400 parts of icewater. 25 parts by volume of 4 N sodium nitrite solution are added dropwise at 0° to 5°C, and the mixture is stirred for 1 hour. The diazo solution is clarified by filtration and is added, at 0° to 5°C, to a solution of 23.1 parts of 1-(m-dimethylaminomethyl)-phenyl-3-methyl-5-pyrazolone in 100 parts by volume of alcohol. The coupling mixture is rendered neutral to Congo Red by means of sodium acetate solution. After completion of coupling, the dyestuff of the formula

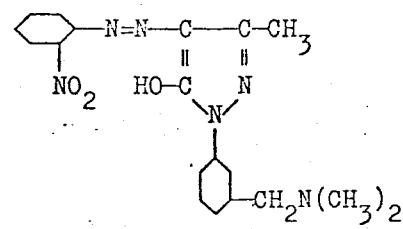

which precipitates is filtered off, washed with a little cold water and dried. It dyes polyacrylonitrile fibres in yellow shades of excellent fastness properties.

The coupling component is obtained by condensation of 3-dimethylaminomethylphenylhydrazine with acetoacetic acid ethyl ester.

EXAMPLE 2

7.6 parts of sodium nitrite are introduced into 136 parts of sulphuric acid monohydrate at 10° to 15°C, and dissolved. 16.3 parts of 2-amino-5-nitrobenzonitrile are thereafter introduced into the solution, which is stirred for 2 hours at 20° to 25°C. The reaction mixture is poured onto 600 parts of ice water and filtered. The excess nitrous acid is destroyed by adding sulphamic acid. The diazo solution thus obtained is added, at 0° to 5°C, to a solution of 23 parts of 1-p-(dimethylaminomethyl)-phenyl-3-methyl-5-aminopyrazole in 200 parts by volume of alcohol. After completion of coupling, the mixture is neutralised with sodium hydroxide solution. The dyestuff of the formula

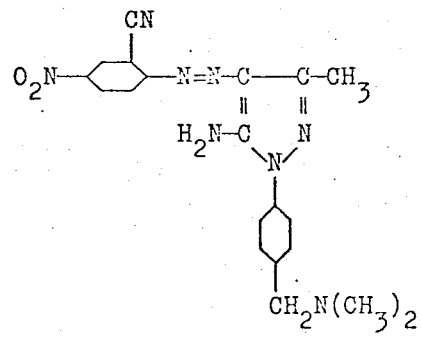

which precipitates is filtered off, washed with water and dried. It dyes polyacrylonitrile fibres in orange shades with excellent fastness properties.

The coupling component is obtained by condensation of 4-dimethylaminomethylphenylhydrazine with diacetonitrile in aqueous acid solution.

The same process yields dyestuffs, which dye polyacrylonitrile fibres in the shades indicated in colum III of the table below, if the diazo components indicated in column I are diazotised and coupled with the coupling components listed in colum II.

| | I | II | III |
|---|---|---|---|
| 1 | 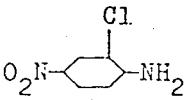 | 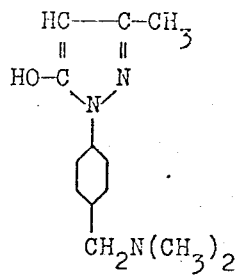 | yellow |
| 2 | 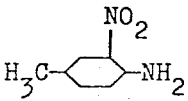 | " | " |
| 3 | 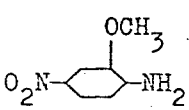 | " | " |
| 4 | 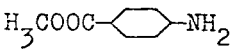 | 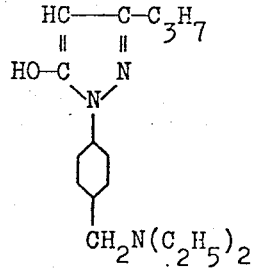 | " |
| 5 | 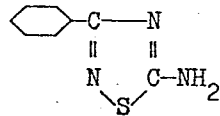 | 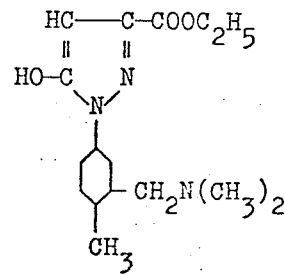 | " |
| 6 | 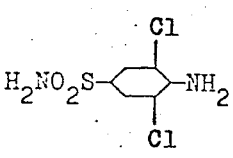 | " | " |

| | I | II | III |
|---|---|---|---|
| 7 | C6H5-N=N-C6H4-NH2 | HC==C-CONH2, HO-C-N(ring)-N, Cl, CH2N(CH2CH2CH2CH2CH2) | yellow |
| 8 | H3CO2S-C6H4-NH2 | HC==C-C3H7, HO-C-N(ring)-N, CH2N(CH2CH2-O-CH2CH2) | " |
| 9 | (3-CH3-C6H4)-N=N-(3-CH3-C6H3)-NH2 | HC==C-CH3, HO-C-N(ring)-N, C4H8N(C2H4OH)2 | " |
| 10 | Cl-C6H3(CF3)-NH2 | HC==C-CH3, HO-C-N(ring)-N, CH(CH3)-N(CH3)2 | " |

| | I | II | III |
|---|---|---|---|
| 11 | 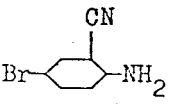 | 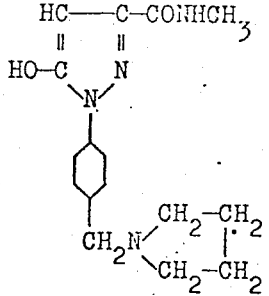 | yellow |
| 12 | 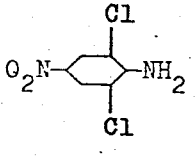 | 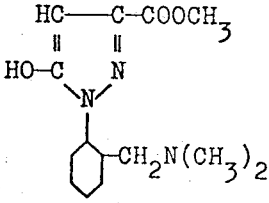 | " |
| 13 |  | 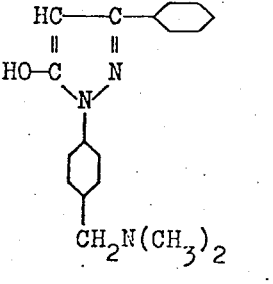 | " |
| 14 | 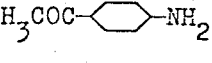 | 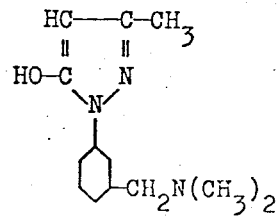 | " |
| 15 | 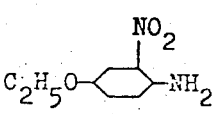 | " | " |

| | I | II | III |
|---|---|---|---|
| 16 | 3-NO$_2$-4-NH$_2$-toluene (H$_3$C-C$_6$H$_3$(NO$_2$)-NH$_2$) | HC=C(CH$_3$)-N=N-C(OH)=N ring, with phenyl bearing CH$_2$N(OCH$_3$)(CH$_3$) | yellow |
| 17 | 3-NO$_2$-4-NH$_2$-toluene (H$_3$C-C$_6$H$_3$(NO$_2$)-NH$_2$) | HC=C(CH$_3$)-N=N-C(OH)=N ring, with phenyl bearing OCH$_2$CH$_2$N(CH$_3$)$_2$ | " |
| 18 | H$_3$C-C(=N-N=)S-C-NH$_2$ (thiadiazole: H$_3$C-C, S, C-NH$_2$, N=N) | HC=C(CH$_3$)-N=N-C(OH)=N ring, with phenyl bearing CH$_2$N(OC$_4$H$_9$)(C$_4$H$_9$) | " |
| 19 | O$_2$N-C$_6$H$_2$(Br)(Cl)-NH$_2$ | HC=C(CH$_3$)-N=N-C(NH$_2$)=N ring, with cyclohexyl bearing CH$_2$N(CH$_3$)$_2$ | orange |
| 20 | O$_2$N-C$_6$H$_3$(Cl)-NH$_2$ | " | " |

| | I | II | III |
|---|---|---|---|
| 21 | 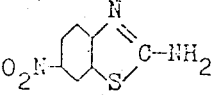 | 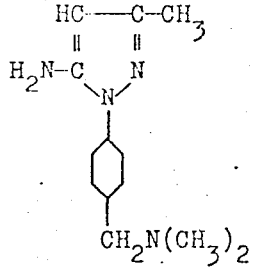 | orange |
| 22 | 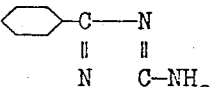 | " | yellow |
| 23 | 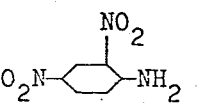 | " | red-orange |
| 24 | 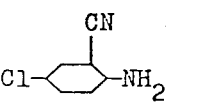 | " | yellow |
| 25 | 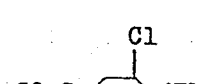 | 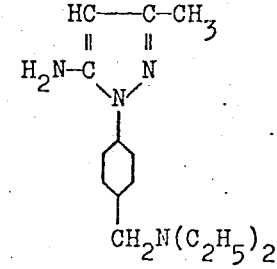 | " |
| 26 | 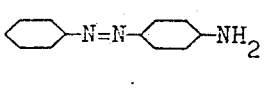 | 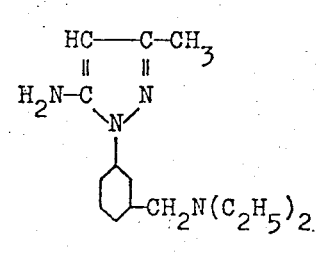 | yellow-orange |

| | I | II | III |
|---|---|---|---|
| 27 | 2-amino-5-nitro-1,3,4-thiadiazole (HC=N, O₂N-C-S-C-NH₂) | HC=C-CH₃ with H₂N-C-N=N, substituted with cyclohexyl-CH₂N(C₂H₅)₂ | scarlet |
| 28 | 2-methyl-6-nitroaniline (H₃C-C₆H₃(NO₂)-NH₂) | HC=C-CH₃ with HO-C-N=N, substituted with cyclohexyl-C₄H₈N(C₂H₄OH)₂ | yellow |
| 29 | H₅C₂OOC-C₆H₄-NH₂ | HC=C-CH₃ with H₂N-C-N=N, substituted with cyclohexyl(CH₃)-CH₂N(CH₃)₂ | " |
| 30 | 2-amino-5-methyl-1,3,4-thiadiazole (N=N, H₃C-C-S-C-NH₂) | " | " |
| 31 | 2-amino-5-cyano-1,3,4-thiadiazole (HC=N, NC-C-S-C-NH₂) | HC=C-CH₃ with H₂N-C-N=N, substituted with cyclohexyl-CH₂N(piperidino: CH₂CH₂-CH₂/CH₂CH₂-CH₂) | scarlet |

| | I | II | III |
|---|---|---|---|
| 32 | [structure: Cl, CF₃, NH₂ on cyclohexane] | [structure: triazole with OCH₃, NH₂, CH₂N(CH₃)₂] | yellow |
| 33 | [structure: (CH₃)₂NO₂S, Cl, Cl, NH₂ on cyclohexane] | [structure: triazole with OCH₃, NH₂, CH₂N(CH₃)₂] | yellow-orange |
| 34 | [structure: NC, thiazole, C-NH₂] | " | orange |
| 35 | [structure: O₂N, OCH₃, NH₂ on cyclohexane] | [structure: triazole with phenyl, NH₂, CH₂N(CH₂CH₂)₂O morpholine] | " |
| 36 | [structure: Cl, thiazole, C-NH₂] | [structure: triazole with CH₃, NH₂, CH₂N(CH₃)₂, OCH₃] | " |
| 37 | [structure: piperidine-NH₂] | " | yellow |

| | I | II | III |
|---|---|---|---|
| 38 | Br—⟨⟩—NH₂ | HC——C—OCH₃, ‖ ‖, H₂N—C  N, \N/, \|, ⟨⟩, \|, CH₂N(CH₂CH₂)₂(CH₂CH₂) | yellow |
| 39 | O₂N—⟨⟩—NH₂ | " | " |
| 40 | NC—⟨⟩—NH₂ | HC——C—CH₃, ‖ ‖, H₂N—C  N, \N/, \|, ⟨⟩, \|, CH₂N(OCH₃)(CH₃) | " |

EXAMPLE 3

2.28 parts of sodium nitrite are sprinkled at 0° to 10°C into 27 parts of concentrated sulphuric acid. The mixture is heated to 65°C until everything has dissolved and is then cooled to 0°C, and 30 parts by voluume of a mixture of glacial acetic acid and propionic acid (in the ratio of 4:1) are added dropwise. The resulting solution is treated dropwise with a solution of 4.35 parts of 2-amino-5-nitrothiazole in 30 parts by volume of a mixture of glacial acetic acid and propionic acid (4:1), and the reaction mixture is stirred for a further 3 hours at 0° to 5°C. 2.28 parts of urea are added in portions to this diazo solution. The diazo solution thus obtained is added to a solution of 6.93 parts of 1-p-(γ-hydroxypropyl)-phenyl-3-methyl-5-aminopyrazole in 50 parts of alcohol at 0° to 5°C. The mixture is stirred for approximately 10 hours longer. After completion of coupling, the mixture is diluted with water and the dyestuff which has precipitated is filtered off, washed with water until neutral and dried.

7.74 parts of the dyestuff thus obtained are dissolved in 100 parts of anhydrous pyridine. 3.4 parts of methanesulphonyl chloride are added dropwise at 0° to 5°C and the mixture is stirred for a further 24 hours at 0° to 5°C, and poured onto 1,500 parts of water. The methanesulphonic ester which precipitates is filtered off, washed with water and dried.

4.65 parts of the methanesulphonic ester thus obtained and 25 parts of pyridine are heated to 80°C for 6 hours. The mixture is evaporated in a reaction evaporator. The residue is dissolved in hot water, with addition of acetic acid, and the solution is filtered. Thereafter, the dyestuff is salted out from the filtrate by means of sodium chloride and zinc chloride. The dyestuff which precipitates, of the formula

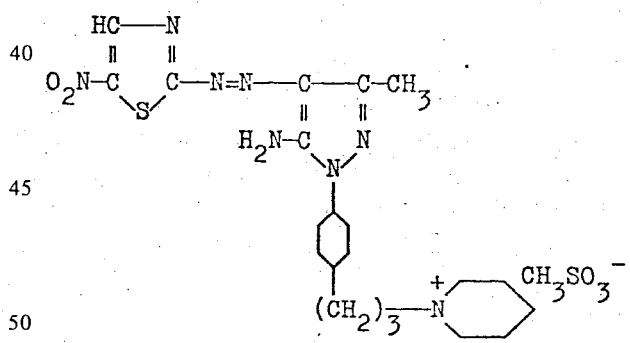

is filtered off and washed with 15% strength sodium chloride solution. It dyes polyacrylonitrile fibres in red shades of very good fastness properties.

If, instead of pyridine, the corresponding amount of trimethylamine, triethylamine, N,N-dimethylhydrazine or triethylhydroxylamine is used, dyestuffs with similar properties are obtained.

EXAMPLE 4

6 parts of 1-p-(γ-methanesulphonyloxypropyl)-phenyl-3-methyl-5-hydroxy-4-(2'-chloro-4'-nitrophenylazo)-pyrazole and 30 parts of piperidine are heated at 80°C for 5 hours. The reaction mixture is cooled and poured out onto 600 parts of water. The excess piperidine is removed by steam distillation. The dyestuff of the formula

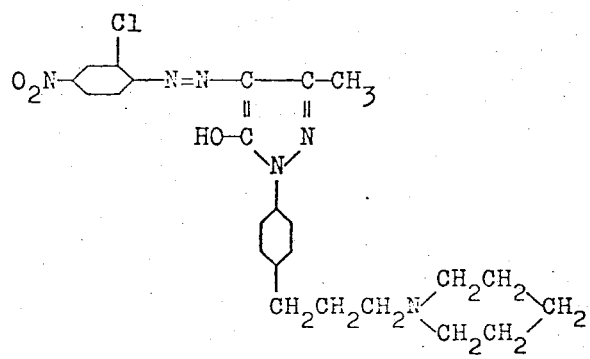

which precipitates is filtered off, washed with water and dried. It dyes polyacrylonitrile fibres in yellow shades of very good fastness properties.

If, instead of piperidine, a corresponding amount of morpholine, pyrrolidine, dimethylamine, diethylamine, O,N-diethylhydroxylamine, benzylamine, cyclohexylamine or aniline is used, dyestuffs with similar properties are obtained.

EXAMPLE 5

4.04 parts of the dyestuff obtained according to Example 2 are dissolved in 100 parts of warm chlorobenzene. A solution of 1.9 parts of dimethyl sulphate in 5 parts of chlorobenzene is added dropwise. The reaction mixture is stirred for 4 hours at 95°C and then cooled. The suspension is filtered off. The filter cake is dissolved in hot water, the solution is filtered, and the dyestuff is salted out from the filtrate. The dyestuff which precipitates, of the formula

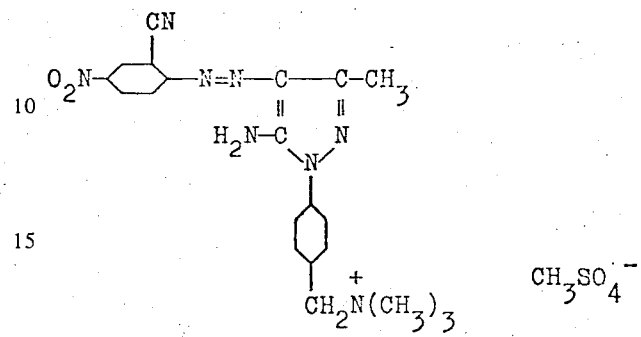

is filtered off. It dyes polyacrylonitrile fibres in orange shades of very good fastness properties.

If the dyestuffs mentioned in column I of the table below are quaternised in the same manner with the alkylating agents mentioned in column II, dyestuffs with the anion mentioned in column III are obtained, which dye polyacrylonitrile fibres in the shades indicated in column IV.

| | I | II | III | IV |
|---|---|---|---|---|
| 1 | $H_3C$—⟨ring, NO$_2$⟩—N=N—C(—C(HO-C)—N—N(ring-CH$_2$N(CH$_3$)$_2$))—C-CH$_3$ | $(CH_3)_2SO_4$ | $CH_3SO_4$ | yellow |
| 2 | $O_2N$—⟨ring, Cl⟩—N=N—C(—C(HO-C)—N—N(ring-CH$_2$N(CH$_2$CH$_2$)$_2$CH$_2$))—C-CH$_3$ | $C_4H_9Br$ | Br | " |
| 3 | $CH_3OOC$—⟨ring⟩—N=N—C(—C(HO-C)—N—N(ring-CH$_2$N(CH$_3$)$_2$, CH$_3$))—C-CH$_3$ | $HOCH_2CH_2Br$ | Br | " |

| | I | II | III | IV |
|---|---|---|---|---|
| 4 | (structure: O₂N-C₆H₃(OCH₃)-N=N-C(COOCH₃)=C, HO-C=N-N, N-C₆H₄-CH₂N(OC₂H₅)(C₂H₅)) | ⌬-CH₂Cl | Cl | yellow |
| 5 | (structure: Cl-C₆H₃(CN)-N=N-C(CH₃)=C, H₂N-C=N-N, N-C₆H₄-CH₂N(CH₃)₂) | (C₂H₅)₂SO₄ | C₂H₅SO₄ | " |
| 6 | (structure: O₂N-C₆H₂(Cl)(Cl)-N=N-C(CH₃)=C, H₂N-C=N-N, N-C₆H₄-CH₂N(CH₂CH₂)₂O) | ⌬-SO₂OCH₃ | ⌬-SO₃ | orange |
| 7 | (structure: ⌬-N=N-⌬-N=N-C(OCH₃)=C, H₂N-C=N-N, N-C₆H₄-C₄H₈N(CH₃)₂) | CH₃I | I | yellow-orange |
| 8 | (structure: O₂N-C(=N-CH=)-S-C=N-N=C(CH₃)=C, H₂N-C=N-N, N-C₆H₄-CHN(C₂H₅)₂-CH₃) | (CH₃)₂SO₄ | CH₃SO₄ | scarlet |

| | I | II | III | IV |
|---|---|---|---|---|
| 9 | (structure with phenyl-thiazole-azo-triazine, $H_2N-C$, $CH_2N(OCH_3)(CH_3)$) | $(CH_3)_2SO_4$ | $CH_3SO_4$ | yellow |
| 10 | (structure with dimethyl-thiadiazole-azo-triazine, $OCH_2CH_2N(C_2H_5)_2$) | $CH_3I$ | $I$ | yellow |
| 11 | (structure with nitrophenyl-azo-hydroxytriazine-phenyl, $CH_2N(CH_3)_2$) | $(CH_3)_2SO_4$ | $CH_3SO_4$ | yellow |

Dyeing Instruction A 1 part of the dyestuff obtained according to Example 1, 1 part of 50% strength neutralised reaction product of 1 mol of a higher alkylamine, having about 20 carbon atoms, with 30 mols of ethylene oxide, 1 part of concentrated acetic acid and 7 parts of water are ground in a ball mill to give a fine dispersion.

The dyestuff preparation described above is added to a dyebath of 400 parts of water and 4 parts of a 50% strength solution of a condensation product of 1 mol of 1-methyl-2-heptadecylbenzimidazole with 7 mols of ethylene oxide, which has been adjusted to a pH-value of 4 with acetic acid. 100 parts of well-wetted polyacrylonitrile flock are introduced, the bath is heated to the boil over the course of 30 minutes, and dyeing is carried out at the boil for 1½ hours. The dyed material is subsequently well rinsed. A level yellow dyeing of excellent fastness properties is obtained.

Dyeing Instruction B 1 part of the dyestuff obtained according to Example 3 is dissolved in 2,000 parts of water, with the addition of 4 parts of 40% strength acetic acid, 1 part of crystalline sodium acetate and 10 parts of anhydrous sodium sulphate. 100 parts of dried yarn of polyacrylonitrile staple fibres are introduced into this dyebath at 60°C, the temperature is raised to 100°C over the course of ½ hour, and dyeing is carried out at the boil for 1 hour. The dyeing is then well rinsed and dried.

I claim:

1. A basic azo dyestuff of the formula

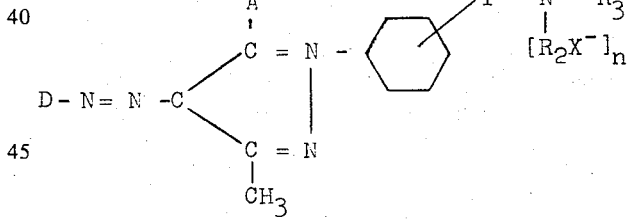

wherein
A is OH or $NH_2$;
D is phenyl, thiazolyl, benzthiazolyl, pyrazolyl, indazolyl, triazolyl, thiadiazolyl, pyridyl or quinolyl that is unsubstituted or substituted by trifluoromethyl, lower alkyl, nitrile, nitro, phenylazo, lower alkoxycarbonyl, lower alkylcarbonyl, lower alkylsulphonyl, chloro, bromo, phenyl, sulphonamido, lower alkylsulphonamido, phenoxy, lower alkoxy, lower carbalkoxy or lower alkylsulphonylamino;
Y is lower alkylene or lower alkyleneoxy;
$R_1$ and $R_2$ each is hydrogen, lower alkyl, benzyl, cyclohexyl, phenyl, chloroethyl or propyl or ethyl substituted by methoxy or hydroxy;
$R_3$ is hydrogen, lower alkyl, benzyl, cyclohexyl, lower alkoxy, benzyloxy, cyclohexyloxy, methylamino, ethylamino, piperidine or pyrrolidine;
$n$ is 0 or 1;
X is an anion.

2. A basic azo dyestuff according to claim 1, wherein A is OH.

3. A basic azo dyestuff according to claim 1, wherein A is NH₂.

4. A basic azo dyestuff according to claim 1, wherein D is phenyl, thiazolyl, benzthiazolyl, pyrazolyl, indazolyl, triazolyl, thiadiazolyl, pyridyl or quinolyl substituted by up to three of trifluoromethyl, lower alkyl, nitrile, nitro, phenylazo, lower alkoxycarbonyl, lower alkylcarbonyl, lower alkylsulphonyl, chloro, bromo, phenyl, sulphonamido, lower alkylsulfonamido, phenoxy, lower alkoxy, lower carbalkoxy and lower alkylsulphonylamino.

5. A basic azo dyestuff according to claim 1, wherein Y is methylene, R₁ and R₂ each is hydrogen, methyl or ethyl.

6. A basic azo dyestuff according to claim 5, wherein Y is p-methylene, R₁ and R₃ each is methyl and $n$ is 0.

7. A basic azo dyestuff according to claim 1, wherein $n$ is 1 and X is Cl⁻, Br⁻, (SO₄)⁼₁/₂, lower alkyl-SO₃⁻, lower alkyl-O-SO₃⁻ or phenyl -SO₃⁻.

8. The basic azo dyestuff according to claim 1 of the formula

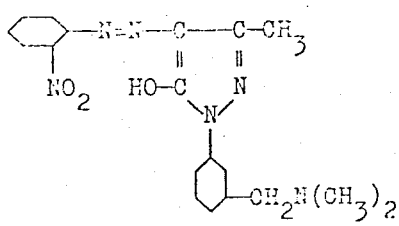

9. The basic azo dyestuff according to claim 1 of the formula

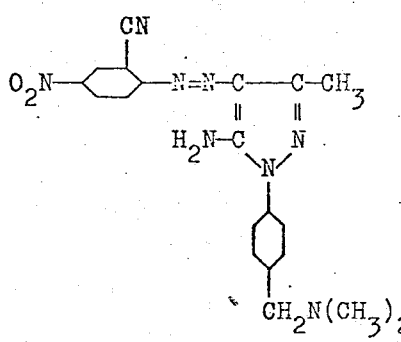

10. The basic azo dyestuff according to claim 1 of the formula

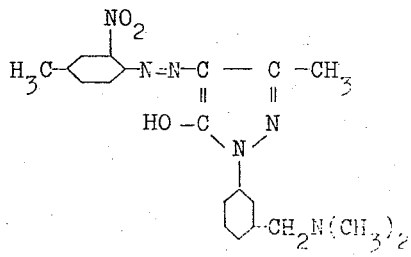

11. The basic azo dyestuff according to claim 1 of the formula

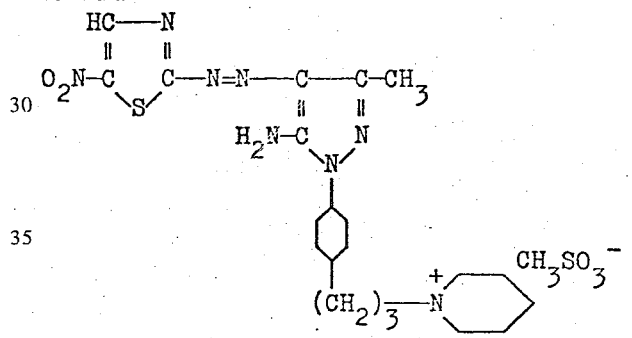

* * * * *